(12) United States Patent
Stack et al.

(10) Patent No.: US 12,424,955 B2
(45) Date of Patent: Sep. 23, 2025

(54) GAS TURBINE WITH AN ELECTRICALLY HEATED THERMAL ENERGY STORAGE SYSTEM

(71) Applicant: Electrified Thermal Solutions, Inc., Medford, MA (US)

(72) Inventors: Daniel Stack, Cambridge, MA (US); Bao Truong, Canton, MA (US)

(73) Assignee: Electrified Thermal Solutions, Inc., Medford, MA (US)

( * ) Notice: Subject to any disclaimer, the term of this patent is extended or adjusted under 35 U.S.C. 154(b) by 0 days.

(21) Appl. No.: 18/790,901

(22) Filed: Jul. 31, 2024

(65) Prior Publication Data

US 2025/0047225 A1 Feb. 6, 2025

Related U.S. Application Data

(60) Provisional application No. 63/516,986, filed on Aug. 1, 2023.

(51) Int. Cl.
*H02P 9/00* (2006.01)
*F01D 15/10* (2006.01)
(Continued)

(52) U.S. Cl.
CPC .............. *H02P 9/006* (2013.01); *F01D 15/10* (2013.01); *F02C 6/00* (2013.01); *F02C 6/14* (2013.01);
(Continued)

(58) Field of Classification Search
CPC ........ H02P 9/006; H02P 2101/25; F02C 6/00; F02C 6/14; F02C 1/05; F02C 7/08;
(Continued)

(56) References Cited

U.S. PATENT DOCUMENTS

2022/0049651 A1* 2/2022 Bollinger .................. F01K 3/18

FOREIGN PATENT DOCUMENTS

| AU | 2021326502 A1 | 3/2023 |
|----|---------------|--------|
| EP | 3303778 B1 | 4/2018 |
| WO | 2015149124 A1 | 10/2015 |

OTHER PUBLICATIONS

International Searching Authority—International Search Report, pertaining to International Application No. PCT/CUS2024/040400 dated Oct. 29, 2024, together with the Written Opinion of the International Searching Authority, 12 pages.

(Continued)

*Primary Examiner* — Loren C Edwards
(74) *Attorney, Agent, or Firm* — Sunstein LLP (57) ABSTRACT

A gas turbine generator system configured to be electrically interconnected to an electrical grid via a first circuit breaker. The gas turbine generator system includes a compressor configured to output a pressurized gas flow to an electrically heated thermal energy storage system which outputs a heated and pressurized gas flow to a gas turbine to cause the gas turbine to rotate and drive an electrical generator. The electrical generator outputs electric power to the electrical grid via the first circuit breaker, operating in a normally closed position. There is a controller to detect an opening of the first circuit breaker and to close a first switch, in response to the opening of the first circuit breaker. The first switch is connected to the output of the electrical generator and to the electrical input of the electrically heated thermal energy storage system, connecting the generator to the thermal energy storage system.

18 Claims, 8 Drawing Sheets

(51) Int. Cl.
  *F02C 6/00*  (2006.01)
  *F02C 6/14*  (2006.01)
  *H02P 101/25*  (2016.01)
(52) U.S. Cl.
  CPC ...... *F05D 2260/42* (2013.01); *H02P 2101/25* (2015.01)
(58) Field of Classification Search
  CPC .. F01D 15/10; F05D 2220/76; F05D 2260/42; H02K 7/1823; F01K 3/02
  See application file for complete search history.

(56) References Cited

OTHER PUBLICATIONS

Boyce, M. P. "Advance Industrial Gas Turbines for Power Generation", Chapter 2, Woodhead Publishing Limited, 2012, pp. 44-102.
Forsberg et al. "Converting Excess Low-Price Electricity into High-Temperature Stored Heat for Industry and High-Value Electricity Production", The Electricity Journal, vol. 30, pp. 42-52, 2017.
Stack, Daniel Christopher "Conceptual Design and Performance Characteristics of Firebrick Resistance-Heated Energy Storage for Industrial Heat Supply and Variable Electricity Production", Thesis submitted to the Department of Nuclear Science and Engineering at Massachusetts Institute of Technology, 166 pages, Feb. 2017.

* cited by examiner

GAS TURBINE WITH AN ELECTRICALLY HEATED THERMAL ENERGY STORAGE SYSTEM

CROSS REFERENCE TO RELATED APPLICATIONS

This application claims priority from U.S. Provisional Application No. 63/516,986 filed Aug. 1, 2023, the disclosure of which is incorporated by reference herein in its entirety. This application also incorporates by reference, in their entireties, each of the following related and commonly owned provisional and non-provisional applications filed on even date herewith: Chromium Electrodes to Deliver Electric Power to Oxide Brick Circuits, U.S. application Ser. No. 18/791,024; Electrically Conductive Brickwork Module for Use as a Heating and/or Thermal Storage System, U.S. application Ser. No. 18/790,819; Ceramic-Metal Composites for Use as Heating Elements for Electrified Resistance Heating and Thermal Energy Storage Systems, U.S. application Ser. No. 18/790,995; Electrically Conductive Brickwork Assembly for Use as a Heating and/or Thermal Storage System, U.S. application Ser. No. 18/790,847; Modulating Electrical Resistance along a Column of E-Bricks, U.S. Provisional Application No. 63/677,824; and Bent Pipe-Shaped Electrically Conductive Cross Brick Design, U.S. Provisional Application No. 63/677,894.

TECHNICAL FIELD

The present disclosure relates to a gas turbine system using a thermal energy storage system and more particularly to such a gas turbine system using the thermal energy storage system to drive the turbine and to provide overspeed protection.

BACKGROUND ART

Internal combustion (gas) turbines installed in many of today's natural-gas-fueled power plants are complex machines, including three main components. The main components include a compressor, a combustion system, and a turbine. The compressor draws air into system, pressurizes it, and feeds it to the combustion system at speeds of hundreds of miles per hour. The combustion system is typically made up of a ring of fuel injectors that inject a steady stream of fuel (i.e. natural gas) into a combustion chamber where it mixes with the air. The mixture is burned at temperatures of more than 2000 degrees F. when an electric spark lights the mixture. The combustion system produces a high temperature, high pressure gas stream that enters and expands through the turbine. The blades spin at high speed and compress or squeeze the air and in turn they spin an electric generator to produce electricity which may be output to an electric power grid.

Another type of turbine is a steam turbine, which utilizes the expansion of high-pressure steam to produce rotational motion, while gas turbines rely on the combustion of fuel and air to drive a high-velocity flow of hot gases through the turbine. Yet, another type of combustion turbine is an external combustion turbine, wherein the combustion occurs external of the turbine, as opposed to internally as with an internal combustion turbine. External combustion turbines using pulverized coal and finely ground biomass as a fuel have been realized.

With any of the above described turbines, a full loss of generator electrical load can cause the operating speed of the turbine to go from normal to catastrophic in a matter of seconds. The electrical load can be lost from generator failure or from an electric grid outage, which may be caused by external sources such as hurricanes, floods or ice storms downing power lines. Overspeed occurs when a turbine's rotational speed goes beyond its design limits. The consequences of an overspeed event can vary depending on the model and type of machine, as well as the duration of the overspeed and how much it exceeds the design limit.

Current turbine overspeed protections include mechanical and/or electrical trip mechanisms designed to prevent damage to the system, such as sensors that detect unsafe conditions and either correct the turbine speed or shut it off. However, these approaches may not be sufficient to protect the equipment and/or personnel.

SUMMARY OF THE EMBODIMENTS

In accordance with one embodiment of the invention, there is a gas turbine generator system is configured to be electrically interconnected to an electrical grid via a first circuit breaker. There is included a compressor configured to compress a received gas and output a pressurized gas flow and an electrically heated thermal energy storage system. The electrically heated thermal energy storage system is configured to receive at a fluid input the pressurized gas flow from the compressor, heat the pressurized gas flow, and output a heated and pressurized gas flow from a fluid output. There is a gas turbine configured to receive the heated and pressurized gas flow from the fluid output of the electrically heated thermal energy storage system to cause the gas turbine to rotate and drive an electrical generator. The electrical generator outputs electric power to the electrical grid via the first circuit breaker, operating in a normally closed position. There is a controller configured to detect an opening of the first circuit breaker, thereby disconnecting the electrical generator from the electrical grid. The controller is configured to operate in an overspeed protection mode, wherein the controller closes a first switch, in response to the opening of the first circuit breaker; wherein the first switch is connected to the output of the electrical generator and to the electrical input of the electrically heated thermal energy storage system, thereby electrically connecting the electrical generator to the electrical input of the electrically heated thermal energy storage system.

In other embodiments, one of more of the following features may be included. The electrically heated thermal energy storage system may comprise a plurality of electrically conductive bricks that generate heat due to the application of electrical power at the electrical input. The electrically heated thermal energy storage system may comprise a plurality of electrically insulating bricks that electrically insulate the plurality of electrically conductive bricks and the electrically heated thermal energy storage system may include a plurality of flow paths from the fluid input to the fluid output to guide the pressurized gas flow through the electrically heated thermal energy storage system and to heat the pressurized gas flow. The pressurized gas flow may be heated to between 1000 degrees and 1700 degrees Celsius. There may be a second switch interposed between the electrical generator and the first circuit breaker and the first switch may be connected at a first end between the second switch and the first circuit breaker and the first switch may be connected at a second end at the electrical input to the electrically heated thermal energy storage system. There may be included a first valve between an output of the compressor and the fluid input of the electrically heated thermal energy storage system. There may be a second valve between an output of the compressor and an input of a third valve and the third valve may have an output connected to ambient. The controller may be configured to control the gas turbine generator system in a thermal charge mode. In the thermal charge mode the controller may cause the first valve to open to disconnect the compressor from the fluid input of the electrically heated thermal energy storage system and it may cause the compressor to be deactivated. The controller may cause the second switch to be opened to disconnect the electrical generator from the electric grid, and it may cause the first switch to be closed to connect the electric grid to the electrical input of the electrically heated thermal energy storage system to heat the electrically heated thermal energy storage system. The controller may be configured to control the gas turbine generator system in a grid power mode to cause the first valve to close to connect the compressor to the fluid input of the electrically heated thermal energy storage system and cause the compressor to be activated. The controller may cause the second switch to be closed to connect the electrical generator to the electric grid, and it may cause the first switch to be opened to disconnect the electrical input of the electrically heated thermal energy storage system from the electric grid. The controller may be configured to control the gas turbine generator system in an overspeed protection mode. In the overspeed protection mode the controller may further cause the first valve to open to disconnect the compressor from the fluid input of the electrically heated thermal energy storage system. The controller may cause the compressor, turbine, and generator to be deactivated, and it may cause the second switch to be opened to disconnect the generator from the electrical input of the electrically heated thermal energy storage system.

In accordance with yet another embodiment of the invention, there is a method for connecting a gas turbine generator system to an electrical grid via a first circuit breaker, the method includes compressing a received gas and outputting a pressurized gas flow, using a compressor. The method includes receiving at a fluid input of an electrically heated thermal energy storage system the pressurized gas flow, heating the pressurized gas flow, and outputing a heated and pressurized gas flow from a fluid output of the electrically heated thermal energy storage system. The method includes receiving, by a gas turbine, the heated and pressurized gas flow from the fluid output of the electrically heated thermal energy storage system to cause the gas turbine to rotate and drive an electrical generator, the electrical generator outputting electric power to the electrical grid via the first circuit breaker, operating in a normally closed position. Upon detecting an opening of the first circuit breaker, the method includes disconnecting the electrical generator from the electrical grid and operating the gas turbine generator system in an overspeed protection mode. Operating the gas turbine generator system in an overspeed protection mode includes closing a first switch, in response to the opening of the first circuit breaker; wherein the first switch is connected to the output of the electrical generator and to the electrical input of the electrically heated thermal energy storage system, thereby electrically connecting the electrical generator to the electrical input of the electrically heated thermal energy storage system.

In further embodiments, one of more of the following features may be included. The electrically heated thermal energy storage system may comprise a plurality of electrically conductive bricks that generate heat due to the application of electrical power at the electrical input. The electrically heated thermal energy storage system may comprise a plurality of electrically insulating bricks that electrically insulate the plurality of electrically conductive bricks. The electrically heated thermal energy storage system may include a plurality of flow paths from the fluid input to the fluid output to guide the pressurized gas flow through the electrically heated thermal energy storage system and to heat the pressurized gas flow. The pressurized gas flow may be heated to between 1000 degrees and 1700 degrees Celsius. The method may further comprise providing a second switch interposed between the electrical generator and the first circuit breaker, connecting the first switch at a first end between the second switch and the first circuit breaker, and connecting the first switch at a second end at the electrical input to the electrically heated thermal energy storage system. The method may further comprise providing a first valve between an output of the compressor and the fluid input of the electrically heated thermal energy storage system, and providing a second valve and a third valve, the second valve positioned between an output of the compressor and an input of a third valve, the third valve having an output connected to ambient. The method may also comprise controlling the gas turbine generator system to operate in a thermal charge mode, including causing the first valve to open to disconnect the compressor from the fluid input of the electrically heated thermal energy storage system, causing the compressor to be deactivated, causing the second switch to be opened to disconnect the electrical generator from the electric grid, and causing the first switch to be closed to connect the electric grid to the electrical input of the electrically heated thermal energy storage system to heat the electrically heated thermal energy storage system. The method may also comprise controlling the gas turbine generator system to operate in a grid power mode, including causing the first valve to close to connect the compressor to the fluid input of the electrically heated thermal energy storage system, activating the compressor, causing the second switch to be closed to connect the electrical generator to the electric grid, and causing the first switch to be opened to disconnect the electrical input of the electrically heated thermal energy storage system from the electric grid. Operating the gas turbine generator system in an overspeed protection mode, may further include causing the first valve to open to disconnect the compressor from the fluid input of the electrically heated thermal energy storage system, causing the compressor, turbine, and generator to be deactivated, and causing the second switch to be opened to disconnect the generator from the electrical input of the electrically heated thermal energy storage system.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

The disclosure and the various features and advantageous details thereof are explained more fully with reference to the non-limiting embodiments and examples that are described and/or illustrated in the accompanying drawings and detailed in the following description. Various aspects of the subject matter discussed in greater detail below may be implemented in any of numerous ways, as the subject matter is not limited to any particular manner of implementation. Examples of specific implementations and applications are provided primarily for illustrative purposes.

Unless otherwise defined, used, or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms "includes," "including," "comprises," and "comprising" specify the presence of the stated elements or steps but does not preclude the presence or additional of one or more other elements or steps.

Gas turbines have over speed conditions when they lose their load, which is generally the electric grid. This disclosure allows redirection of electricity generated at the generator from the electric grid to an electrically heated thermal energy storage system (E-TESS) in the event of loss of the generator load, i.e. a loss of power on the grid. Normally, when the turbine is running and the generator is producing electric power, a switch/breaker to the grid is closed. In the scenario when this breaker is suddenly open, due to a fault condition in the electric grid, for example, then with the system of this disclosure, a breaker or switch to the electrically heated E-TESS may be closed immediately and the electricity delivered to the electrically heated E-TESS which can readily absorb the electric power, until the gas turbine can be shut down gracefully. With prior art systems, overspeed protections include mechanical and/or electrical trip mechanisms such as sensors and breakers/switches that detect unsafe conditions and either correct the turbine speed or shut it off. However, prior to correction or shutdown, the system may still be damaged due to overspeed conditions.

In addition to acting as part of an overspeed protection system for the gas turbine, the E-TESS may be used as the source of heated compressed gas used to drive the gas turbine, which in this case may be an external combustion turbine. With external combustion turbines, the combustion occurs external of the turbine, in this case in the E-TESS, as opposed to internally in the case of an internal combustion gas turbine. Thus, the E-TESS system herein is used to drive the turbine, which spins the generator to produce and output to a power grid electric power.

An example of such an E-TESS is described in U.S. Pat. No. 11,877,376, which is incorporated herein by reference in its entirety. Another E-TESS is depicted In FIGS. 1-5 and described below. This E-TESS is described in further detail in commonly owned provisional and non-provisional applications filed on even date herewith referenced above in the Cross Reference to Related Applications Section.

Before describing the gas turbine generator system according to this disclosure, we describe an exemplary E-TESS which may be used in the gas turbine system described herein. It should be noted that any other suitable E-TESS may be used to drive the turbine and to provide overspeed protection according to this disclosure and the E-TESS described herein is only an example of one such system.

Embodiments described herein may comprise, or make use of, electrically-conductive (and thermally conductive) bricks ("E-bricks"). E-bricks generate heat when a current is run through them via direct resistance heating (DRH). E-bricks may be capable of reaching very high temperatures, such as 1000 C to 2000 C or higher, and reliably cycling between a predetermined temperature range (e.g. ~1000 C to ~1800 C) on a daily basis. E-bricks may be stacked and arranged into a large structure, a thermal energy storage system ("TESS") (a.k.a. an electrically heated thermal energy storage system E-TESS). Examples of E-bricks and E-TESS's may be found in U.S. Pat. No. 11,877,376, the contents of which are hereby incorporated, in full, by reference. Embodiments of E-TESS's may be used, for example, in various industrial and chemical processes that generate and/or consume heat, such as furnaces, kilns, refineries, power plants, allowing these processes to significantly reduce or eliminate burning of fossil fuels.

Figure 1:
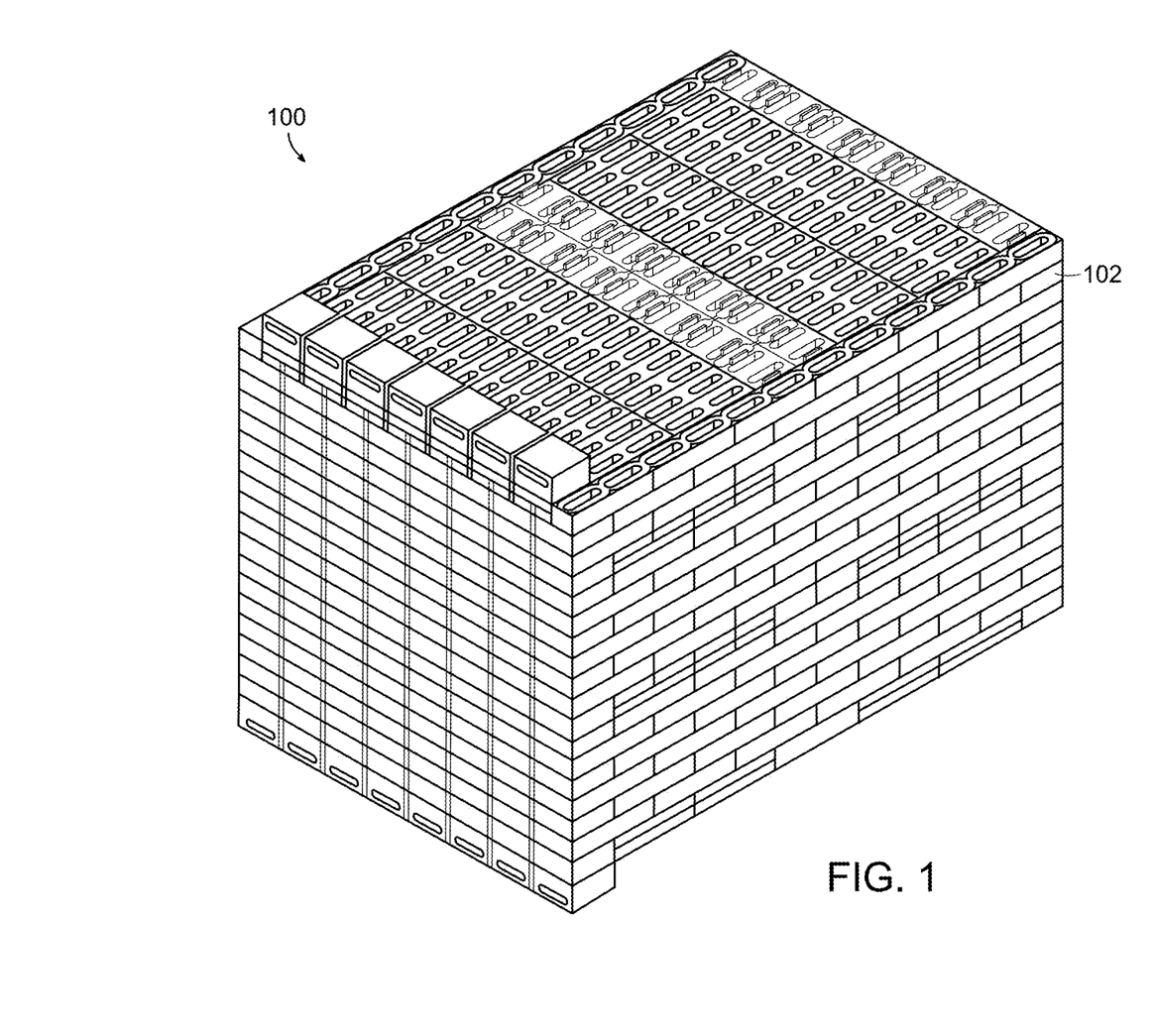
FIG. 1 provides a perspective view of an exemplary E-TESS system according to an aspect of this disclosure.
Figure 2:
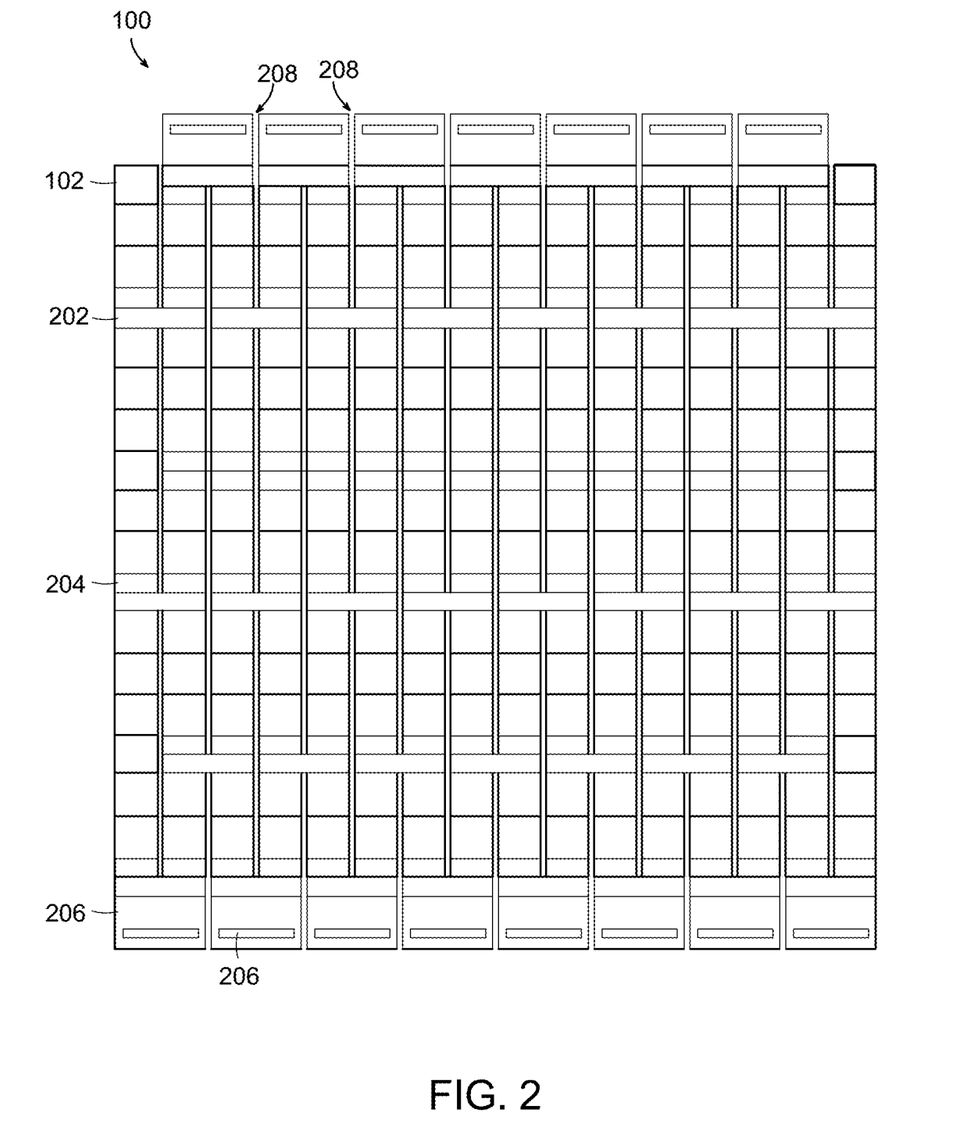
FIG. 2 provides a cross-sectional view of the exemplary E-TESS system of FIG. 1.

FIG. 1 shows an exemplary embodiment of an E-TESS module 100, which is primarily composed of a large quantity of electrically and thermally conductive brick assemblies 102 ("E-brick assemblies"). The E-brick assembly 102 may comprise an electrically-conductive brick 300 ("E-brick"), FIG. 3, contained within an electrically insulating (but thermally conductive) brick 400 ("I-brick"), FIG. 4. In some embodiments there may be more than one E-brick contained within an I-brick, or there may be a plurality of I-bricks that, in combination, provide insulation to one or more E-bricks. In FIGS. 1 and 2, only the I-bricks of the E-brick assemblies 102 are visible, as the E-bricks are contained in an internal region within the I-brick as shown in FIG. 4 and described below. The E-bricks in each column are physically in contact with each other and physically connected to the E-bricks in adjacent columns to form one contiguous electrical circuit when a voltage is applied across the E-TESS module 100, thereby causing an electric current to flow through the electrical circuit formed by the E-bricks.

The E-TESS module 100 generates a large amount of thermal energy when an electrical current is run through the contiguous circuit of E-bricks. The thermal energy may be stored in the E-bricks/I-bricks for extended periods of time (e.g., up to 24 hours). The thermal energy may be harvested immediately, or after it has been stored, by flowing a fluid, e.g., a gas, such as air or $CO_2$, through E-TESS module 100. The thermal energy in the E-bricks is transferred to the I-bricks and flow paths or channels (shown in FIG. 2) between the columns of E-brick assemblies 102 allow the fluid to flow through the E-TESS module 100. This application may henceforth refer to fluid, gas, or air flowing through the flow paths or channels of E-TESS module 100, but it should be noted that these terms may be used interchangeably herein and are intended to have the same meaning. Moreover any suitable fluid, such as air or $CO_2$, may be used to extract the heat out of E-TESS module 100. Additionally, some bricks are left out of the view in FIG. 1 to provide easier viewing.

FIG. 2 shows a side view of an embodiment of E-TESS module 100. The E-TESS module 100 comprises a large quantity of E-brick assemblies 102, arranged in a plurality of adjacent columns, which are physically and electrically interconnected in a serpentine fashion to form a contiguous circuit. The E-brick assemblies 102 may, in large part, be conductive only in the vertical direction (i.e., along the length of the columns), and electrically externally insulated in all other directions by the I-bricks, such that current follows the serpentine circuit (via the connected E-bricks) and does not arc between columns of E-brick assemblies 102, when there is a potential difference between the columns, e.g. in a case where different phases power are being run through adjacent columns.

Between columns there are flow paths or channels 208, through which air may flow (in the direction into or out of the page) in order to extract or harvest the thermal energy generated by the E-bricks to be used to a heat load. By flowing the air through the flow paths 208 the heat may be extracted from the E-TESS module 100 without having the air contact the E-bricks directly. This is especially useful because if the E-bricks comprise $Cr_2O_3$ and are exposed to the flowing air directly, then the $Cr_2O_3$ tends to volatilize, which erodes the brick electrical performance over time, and also produces a toxic gas, $CrO_3$, which must be kept below regulated levels and as low as possible.

Current may enter the E-TESS module 100, for example, through a cable (not shown) connected to the top left corner (from the perspective of FIG. 2), and may exit the E-TESS 100 through a cable (not shown) connected to the top right corner. In addition to the E-brick assemblies 102, there may be other bricks, such as double-wide bricks 202, thin bricks 204, and end connector bricks 206 used in the E-TESS module 100.

Double-wide bricks 202 provide horizontal stabilization between columns of E-brick assemblies 102, and structural integrity of the E-TESS module 100. Double-wide bricks 202 are insulated such that current can flow vertically within columns, but does not flow across them between columns. Double-wide bricks 202 may be thinner (i.e., have a lower height) than E-brick assemblies 102, because double-wide bricks 202 span the gaps 208 between columns, and therefore partially obstruct the airflow through the gaps 208. Double-wide bricks 202 may, for example, be half the height of an E-brick assembly 102.

Thin bricks 204 are single-wide, like an E-brick assembly 102, but thinner, i.e., have a lower height than an E-brick assembly 102. Thin bricks 204 may, for example, be half the height of an E-brick assembly 102. Thin bricks 204 may be used in conjunction with double-wide bricks 202 such that the height of the double-wide brick 202 and thin brick 204 stack is equal to the height of an E-brick assembly 102. Thin bricks 204 may also be used in place of a double-wide brick 202 to maintain even levels of bricks in situations where a double-wide brick 202 is not desirable in at least one column, e.g., due to its obstructing effect on airflow, but is desirable in another column of that level.

End connector bricks 206 connect columns of bricks together, both physically and electrically. End connector bricks 206 act as end caps to columns of bricks and contain within them E-bricks which may be of a different shape that those contained in the E-brick assemblies 102 to physically and electrically connect the E-Bricks from one column of E-brick assemblies 102 to an adjacent column of E-brick assemblies 102. Current may, for example, flow down one column of bricks, perform a "U-turn" through an end connector brick 206, and then flow up the adjacent column, until it reaches the next end connector brick 206, wherein it will perform another "U-turn", and continue in that fashion. End connector bricks may have channels or cutouts though which air may flow. End connector bricks 206 may typically have a flat bottom (or top, depending on its orientation).

Figure 3:
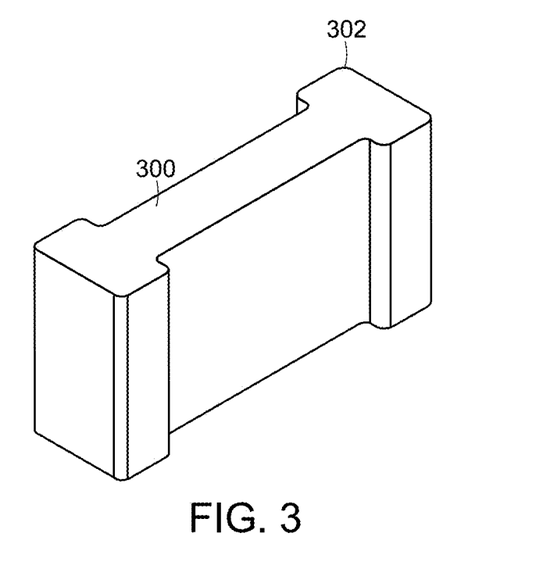
FIG. 3 provides a perspective view of an exemplary electrically conductive brick of the E-TESS system according to an aspect of this disclosure.
Figure 4:
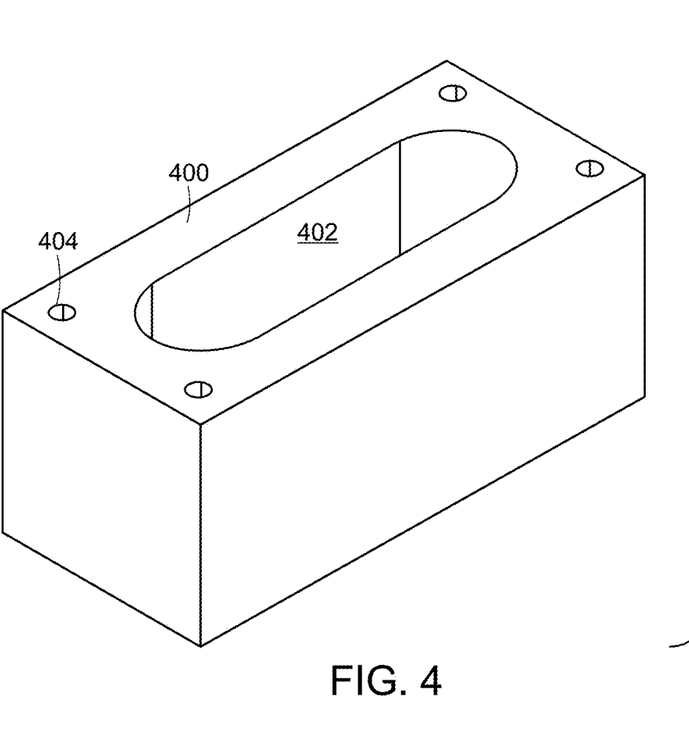
FIG. 4 provides a perspective view of an exemplary electrically insulative brick of the E-TESS system according to an aspect of this disclosure.

FIG. 3 shows a specific embodiment of an electrically-conductive brick 300 ("E-brick"). As described above, E-bricks 300 may be configured to stack vertically with each other, which creates a part of a conductive circuit through which current and heat may flow. E-bricks 300 may be formed in many different shapes, including cross-sectional shapes of circles, rectangles, squares, or crosses, for example. FIG. 3 shows an example of a "dog bone" shaped E-brick. The E-brick 300 may have rounded or chamfered corners 302.

Referring also to FIG. 4, an E-brick 300 is configured to fit within an electrically insulating brick 400 ("I-brick"). I-brick 400 may have a hollow internal region 402, in which an E-brick 300 may fit. An E-brick assembly 102 may comprise an E-brick 300 inside of an I-brick 400. Based on the E-brick design, the exterior shape of the I-brick and the shape of the hollow internal region 402 may have differing shapes. Other bricks may also comprise an E-brick inside of an I-brick. The hollow 402 may extend through the height of the I-brick 400 so that the E-brick 300 may conductively connect with the E-bricks above and below.

Some I-brick embodiments may comprise multiple hollows, such as a double-length I-brick with two collinear hollows, each capable of housing an E-brick. The relative sizes of the E-brick 300 and I-brick 400 may be such that there are several millimeters of clearance between the exterior sides of the E-brick and the interior sides of the I-brick hollow. For example, there may be 1, 2, 5, 7, or 10 mm of clearance. The clearance allows thermal expansion to occur at different rates between the E-brick 300 and I-brick 400, due to material and temperature differences, and reduces friction damage between the E-brick 300 and I-brick 400. The rounded corners 302 also help reduce friction damage. Other bricks may have a hollow similar to hollow 402. I-bricks may comprise pin holes 404, in which pins or rods may be placed in order to align stacks of bricks. I-bricks 400 may be made in different shapes, both of the external sides and the internal hollow 402.

Figure 5:
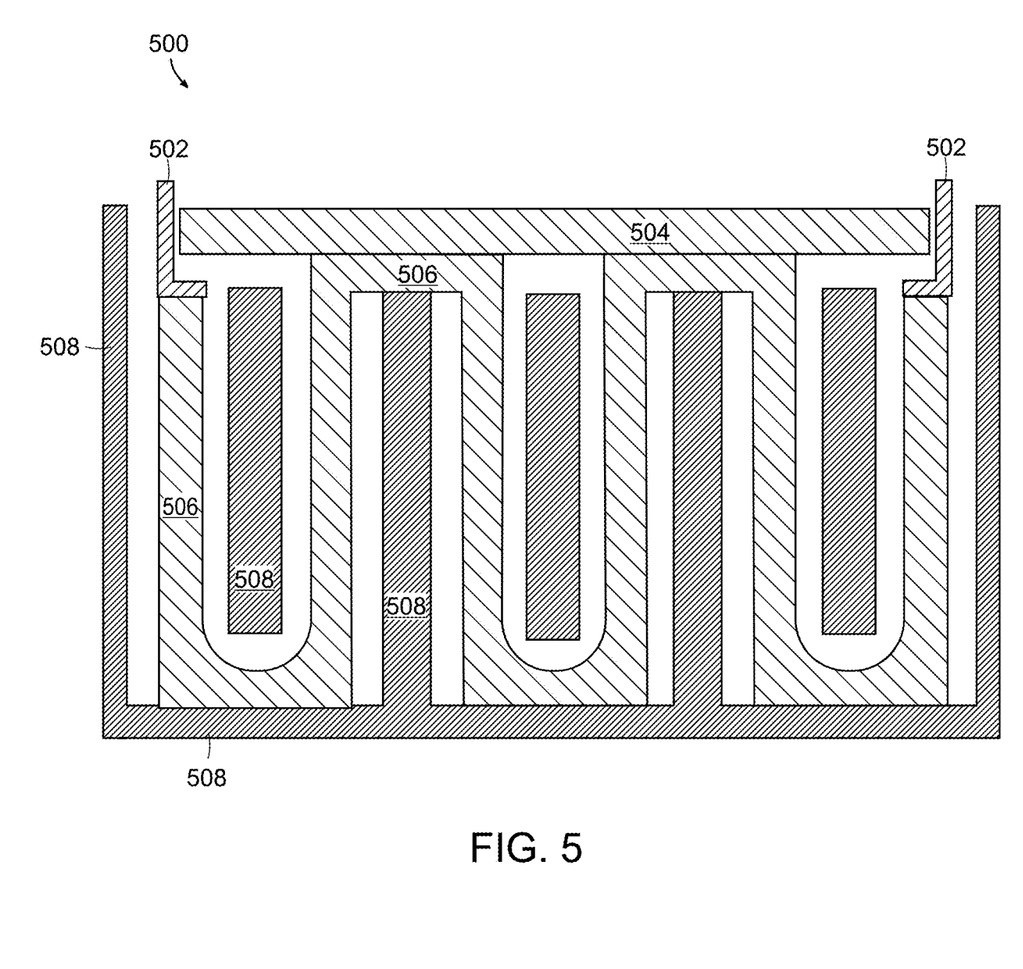
FIG. 5 provides a cross-sectional view of an exemplary E-TESS system according to an aspect of this disclosure depicting a circuit of electrically conductive brick connected to input and output electrodes.

FIG. 5 shows a cross-sectional view of an embodiment of an electrically conductive brickwork module 500 according to the present disclosure. In this embodiment, electrodes 502, which are electrically connected by means of an external current source (not shown) pass through an insulating cover 504 into the electrically conductive brickwork module 500, thereby making contact with a serpentine circuit of E-bricks 506, which are resistively heated as current passes through them from the electrodes 502. The E-bricks 506 transfer heat to the thermal I-bricks 508, thereby providing an efficient thermal energy storage mechanism.

An E-TESS, according to an aspect of this disclosure may be used to drive a turbine to produce power for an electric grid and to provide overspeed protection. The turbine system may include a compressor that is configured to compress a received gas and output a pressurized gas flow to the E-TESS. As described above, the E-TESS may include a plurality of electrically conductive bricks which generate heat due to the application of electrical power at an electrical input. In one case, the power input may be supplied from the electric grid or another electric power source not shown. The E-TESS is configured to receive the pressurized gas flow from the compressor, heat the pressurized gas as it flows through the E-TESS system, and output a heated and pressurized gas flow.

Overspeed of the turbine/electrical generator following a load rejection (i.e. a disconnection from the electric grid) is a serious problem as there is a lot of stored energy in the electrically heated thermal energy storage system and the high pressure piping. The traditional ways preventing over speed is to cut off the energy source to the turbine (i.e. by turning off fire, dumping air, or bypassing). However, this may not be feasible if the valves must be rated to very high temperature and high pressure (valves act mainly as isolation rather than fast acting). Therefore, a way to have continuous load on the turbine system while shutting the system down is necessary. This disclosure allows a continuous load on the turbine/generator by having the electrically heated thermal energy storage system acting as a load until the turbine system can safely shut down.

Operating an electrical switch is much faster than opening/closing of mechanical valves which means that there will be very little over speed. Once the electricity is directed to the electrically heated thermal energy storage system, the system can shut down gracefully. This solution can work for any generic gas turbine.

Figure 6:
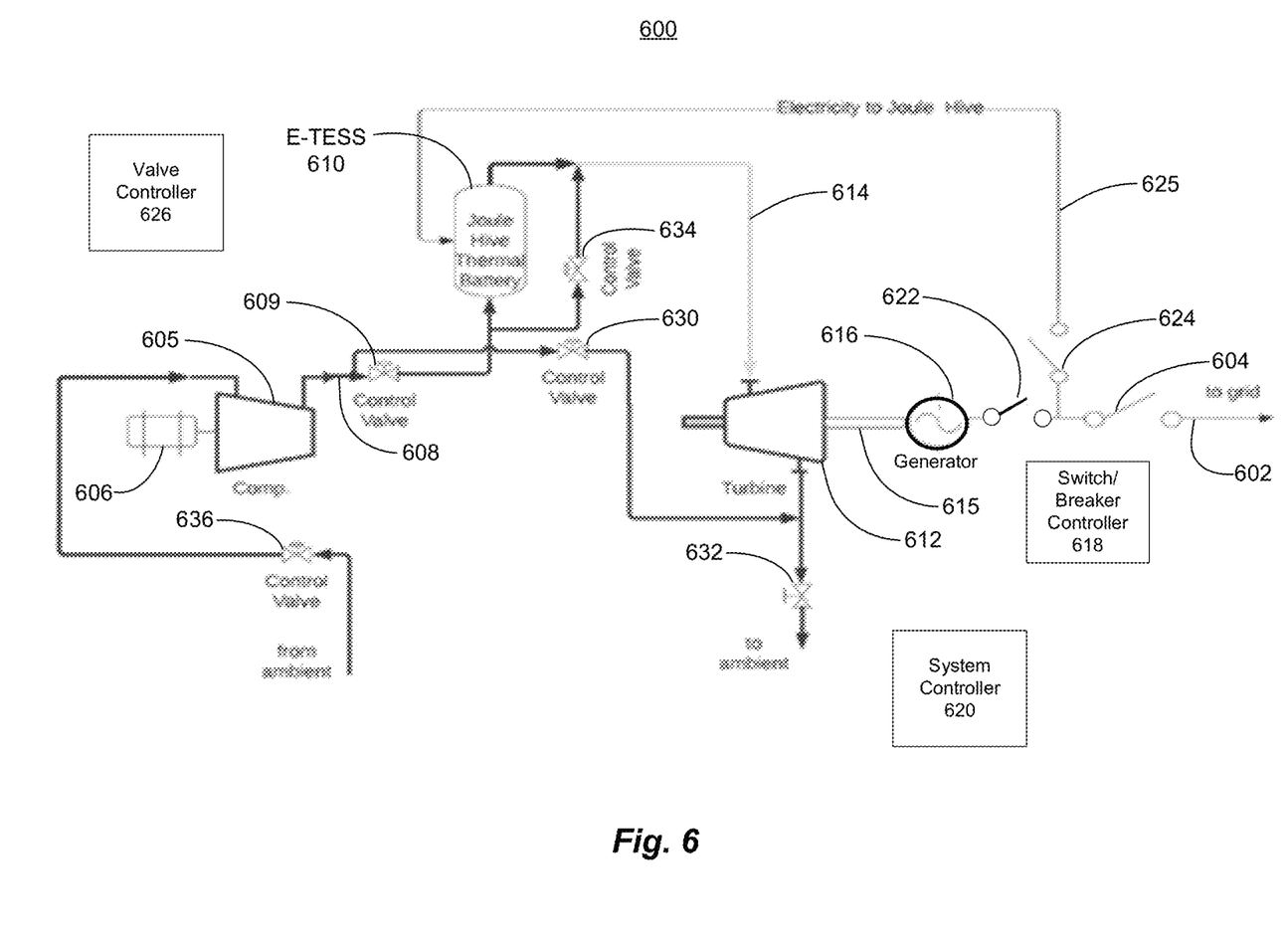
FIG. 6 provides a schematic diagram of an embodiment of a gas turbine generator system according to this disclosure.

A gas turbine generator system 600 according to an aspect of this disclosure is depicted in FIG. 6. The gas turbine generator system 600 is configured to be electrically interconnected to an electrical grid 602 via a first circuit breaker 604 to provide electrical power to the grid. The gas turbine generator system 600 includes a compressor 605 that compresses a gas supplied from storage tank 606 and outputs a pressurized gas flow on line 608 to E-TESS 610 via control valve 609 when the system requires the compressed gas to be heated by the TESS 610 to drive the turbine 612 with heated and compressed gas via line 614. When the turbine is being driven it rotates shaft 615, which in turn spins electrical generator 616 to produce electric power to be output to electric grid 602.

In a grid power mode of operation when generator 612 is outputting electric power to the electric grid 610, first circuit breaker 604 is operated in a closed state under the control of switch/breaker controller 618, which is ultimately controlled by system controller 620. In the grid power mode, switch/breaker controller 618 closes switch 622 and opens switch 624. Thus, electric power output from generator 616 is output to electric power grid 602.

Before gas turbine generator system 600 can output electric power to the electric grid 602 and operate in grid power mode, E-TESS 610 must be thermally charged so that it can heat the compressed gas coming from the compressor 605 to drive turbine 612 to, in turn, spin electrical generator 616. In thermal charge mode, the system controller instructs switch controller to open switch 622 and to close switch 624, so that electric power from electric grid 602 may be supplied via line 628 to E-TESS 510 until it is thermally charged to its operating temperature of typically between 1000 to 1700 degrees Celsius.

Using inputs from sensors in E-TESS 610, system controller 620 may transition from thermal charging mode to thermal storage mode, when the E-TESS is fully thermally charged, i.e. when it reaches operating temperature. The thermal energy may be stored in TESS 610 for up to approximately twenty four (24) hours when electric grid 602 does not require power from gas turbine generator system 600. It should be noted that gas turbine generator system 600 is used a supplemental power supply to electric grid 602 and does not need to supply power on an ongoing basis. For example, it may be used to supply additional power to the electric grid 602 during peak demand hours. In thermal storage mode, the system controller instructs switch controller to maintain switch 622 in the open position and to open switch 624, so that electric power from electric grid 602 is not supplied via line 628 to E-TESS 510.

When the system is transitioning form thermal charging or thermal storage mode (after the thermal energy has been stored for a period of time) and supplemental power from gas turbine generator system 600 is required by the electric grid 602, system controller 620 may transition to grid power mode and cause the switch/breaker controller 618 to open (or maintain open) switch 624 to stop electrically powering E-TESS 610. After the turbine has been activated (described below) and is driving generator 616 at the required voltage and frequency, switch/breaker controller 618 can close generator switch 622. In electric power mode, switch controller 618 also ensures that breaker 604 is closed (i.e. there is not a fault condition on grid 602) so generator 616 can be electrically connected to electric grid 602.

In addition to interfacing with switch/breaker controller 618, system controller 620 may communicate with valve controller 626 to open valve 609 and system controller 620 may activate compressor 605, such that compressed gas (typically in the range of 5 bar to 25 bar) may be fed to E-TESS 610. The compressed gas is passed through the E-TESS 610 to heat it to the operating temperature of between 1000 to 1700 degrees Celsius and feed the compressed and heated gas over line 614 to the input of turbine 612. The compressed heated gas causes turbine 612 to rotate which spins shaft 615 and drives generator 616.

There are other valves in the system under the control of valve controller 626. For example valve 630 must be closed when system 600 is in electric power mode so all of the gas from compressor is directed to E-TESS 610 over line 608. When the system is not in electric power mode there may be gas remaining in the system that needs to be vented to ambient air, in which case the valve controller closes valve 630 (with valve 609 open) to vent the remaining gas. For various reasons, the compressed gas may need to be diverted around E-TESS 610, so valve controller may cause valve 609 to open and valve 634 to close so the compressed gas bypasses E-TESS 610. There is also a valve 636 which controls the flow of ambient air into the compressor when the system needs to be purged of gas that has been supplied by gas storage tank 606, for example.

When gas turbine generator system 600 is outputting electric power to the electric grid 602 in grid power mode, switch/breaker controller 618 is monitoring breaker 604 to determine when it opens indicating a fault condition on electric grid 602. When this occurs, the system transitions to an overspeed protection mode and switch/breaker controller 618 closes switch 624 to direct the electrical output of generator 616 to E-TESS 610 over line 622. This immediately provides generator 616 with a sufficient load to prevent it from going into an overspeed condition. System controller 620 terminates operation of compressor 605 and turbine 612, which in turn will stop rotation and electrical output of generator 616. System controller 602 also instructs valve controller 626 to close valve 609 to prevent gas output from compressor 605 from being provided to E-TESS 610 and it opens valves 630 and 632 to direct gas flow from compressor 605 to ambient air output. It also opens valve 636 to prevent further intake of air from ambient input.

In order to be able to absorb the generator 616 output to prevent an overspeed condition, the E-TESS 610 must be designed/sized to handle the generator output in terms of voltage, current, and power. It may be designed to provide at least 10% margin, i.e. with a generator output of X MW of power an E-TESS capable of handling 110% of X MW may be sufficient. In the case where the E-TESS is also providing the compressed and heated gas to drive the turbine (as the system described herein) the sizing of the E-TESS will not be an issue since the E-TESS is somewhat inefficient, e.g. 50% efficiency. In order for the turbine/generator to output X MW to the electric grid the power rating for the E-TESS must be approximately 2X MW. This rating makes the E-TESS very capable of handling the generator output for overspeed protection.

It will be understood that a single breaker or switch (in place of breaker 604 and switch 624) could be used to both disconnect the electric generator from the grid and to connect the output of the electric generator to the electrically heated thermal energy storage system when the generator is disconnected from the grid. It will also be understood that a single system controller, i.e. system controller 620 could implement the functions of switch/breaker controller 618 and valve controller 626.

Figure 7:
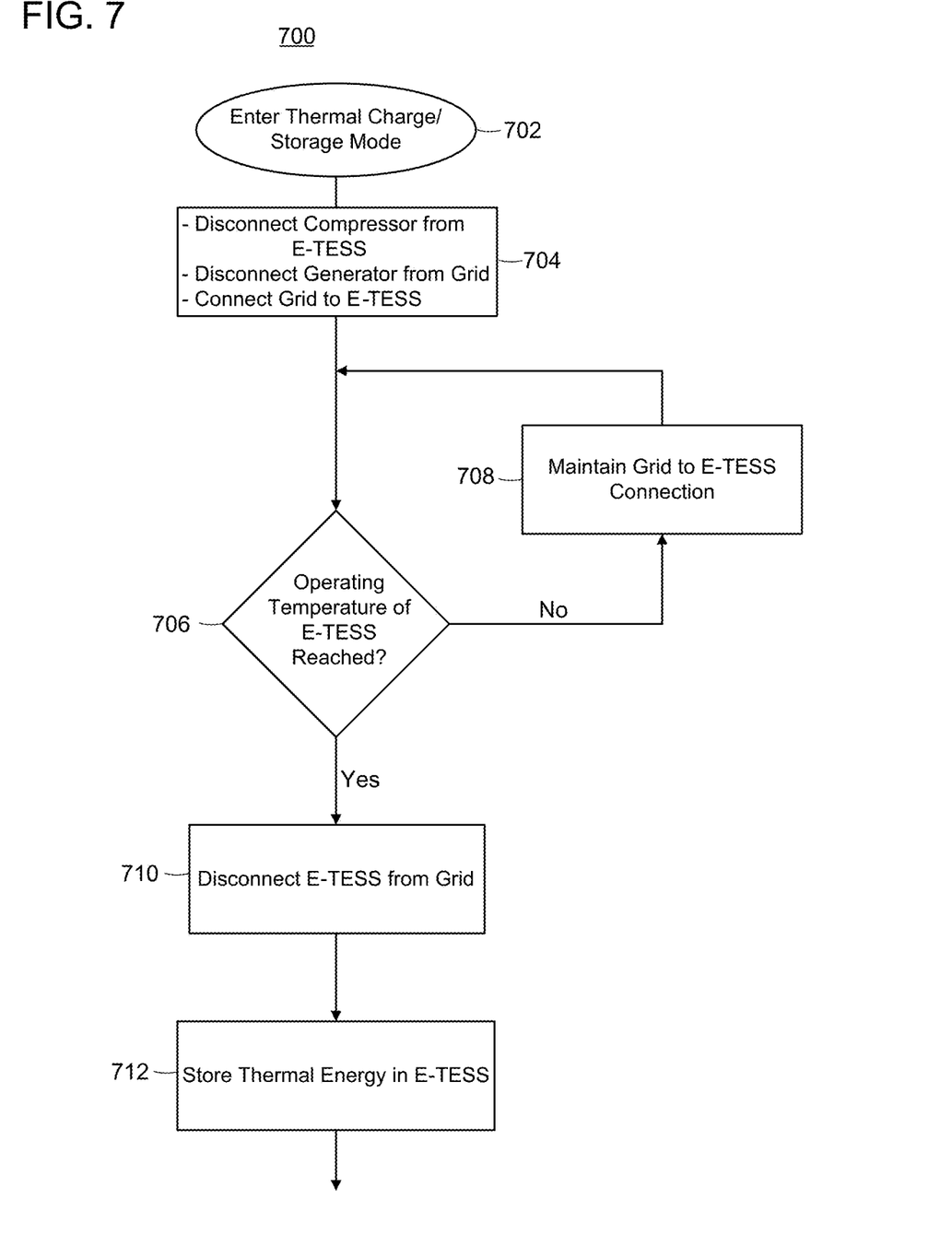
FIG. 7 provides a flow chart depiction operation of the gas turbine generator system of FIG. 6 in thermal charge/storage mode.

Referring to flow chart 700 in FIG. 7 there is depicted the operation of gas turbine generator system 600 during thermal charge/storage mode. As described above, E-TESS 610, FIG. 6, must be thermally charged so that it can heat the compressed gas coming from the compressor 605 to drive turbine 612 to, in turn, spin electrical generator 616. When the system controller 620 determines that E-TESS 610 must be thermally charged, based on a certain low temperature sensed in E-TESS 610, thermal charge/storage mode is entered at step 702 of flow chart 700. At step 704, compressor 605 is disconnected from E-TESS 610, generator 616 is disconnected from grid 602 by the opening of switch 622 and switch 624 is closed to connect the electrical input of E-TESS 610 to the electric grid 602 via line 625.

Flow chart 700 proceeds to step 706 where the temperature of the E-TESS 610 is checked and if it has not reached its operating temperature, in step 708 the system causes switch 624 to remain closed to maintain the connection of electric grid 602 to the electrical input of E-TESS 610. This loop continues until the operating temperature of E-TESS 610 has been reached in step 706. When the operating temperature has been reached in step 710, switch 624 is opened to disconnect the electrical input of E-TESS 610 from the electric grid 602 and in step 712 the system enters thermal storage mode to store the thermal energy in E-TESS 610 until it is needed to power turbine 612 in power grid mode. When E-TESS 610 is fully thermally charged, i.e. when it reaches operating temperature. The thermal energy may be stored in E-TESS 610 for up to approximately twenty four (24) hours.

Figure 8:
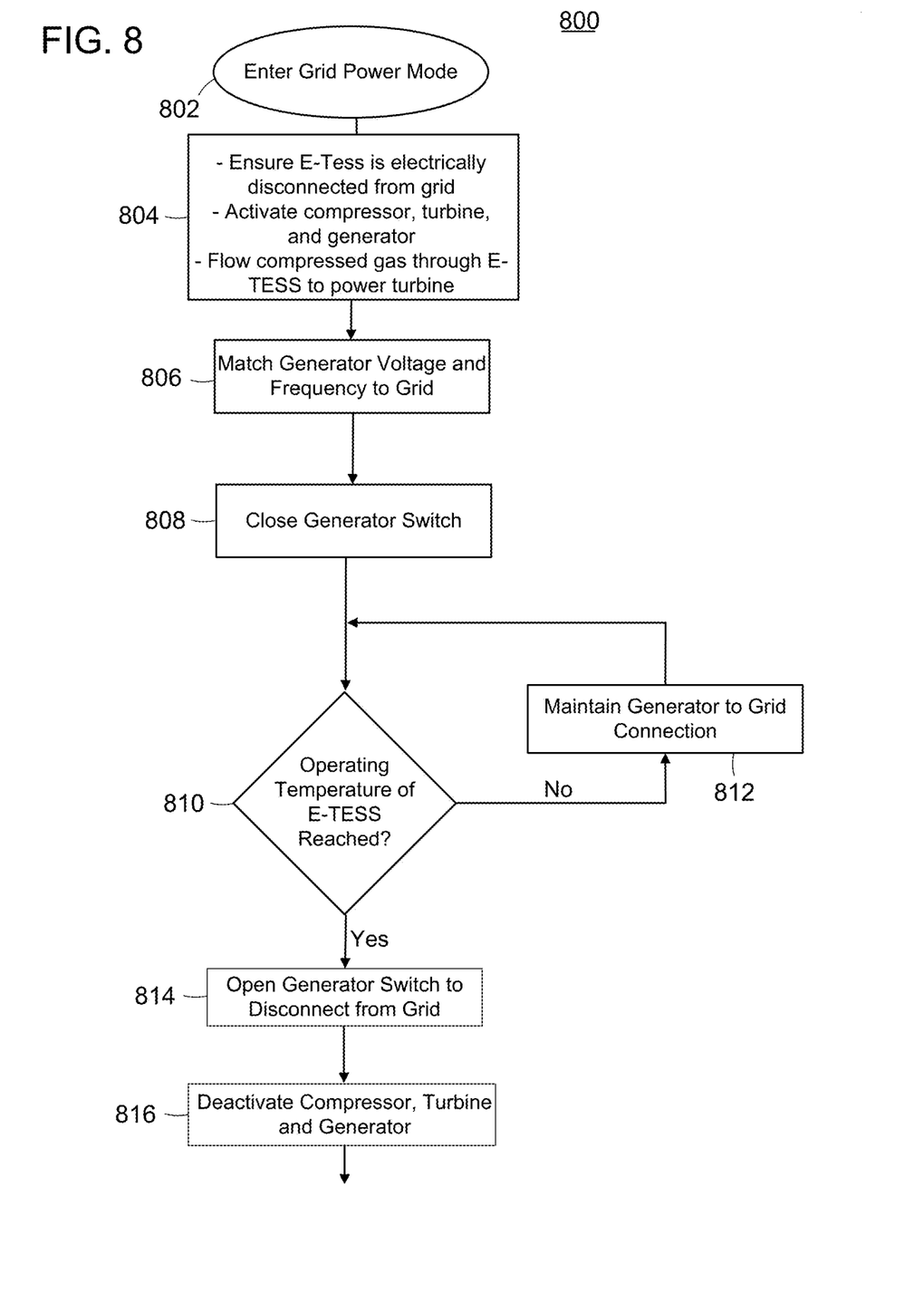
FIG. 8 provides a flow chart depiction operation of the gas turbine generator system of FIG. 6 in grid power mode.

Referring to flow chart 800 in FIG. 8 the operation of gas turbine generator system 600 during grid power mode is depicted. When E-TESS 610 is sufficiently charged and electric grid 602 demands power from gas turbine generator system 600, the system may enter grid power mode at step 802 in flow chart 800. In this mode, at step 804, the system controller 620 causes the switch/breaker controller 618 to open (or maintain open) switch 624 so as to not electrically power E-TESS 610. At step 804, system controller 620 also activates compressor 605, turbine 612, and generator 616 and causes the compressor 605 to flow compressed air to and through E-TESS 610 to power turbine 612 and spin generator 616. At step 806 generator 616 is driven to match the required voltage and frequency of the electric grid 602, and at step 808 switch/breaker controller 618 closes generator switch 622 to connect the generator 616 to the electric grid and deliver power thereto.

At step 810, the E-TESS 610 temperature is monitored and it is determined if a lower temperature threshold has been reached. If not, the system continues to operate in grid power mode step 812. If the lower temperature threshold is reached at step 810, the system proceeds to step 814 where the generator switch 622 is opened to disconnect the gas turbine generator system 600 to electrically disconnect it from the electric grid 602. At step 816, the compressor, turbine and generator are deactivated and grid power mode is terminated.

Figure 9:
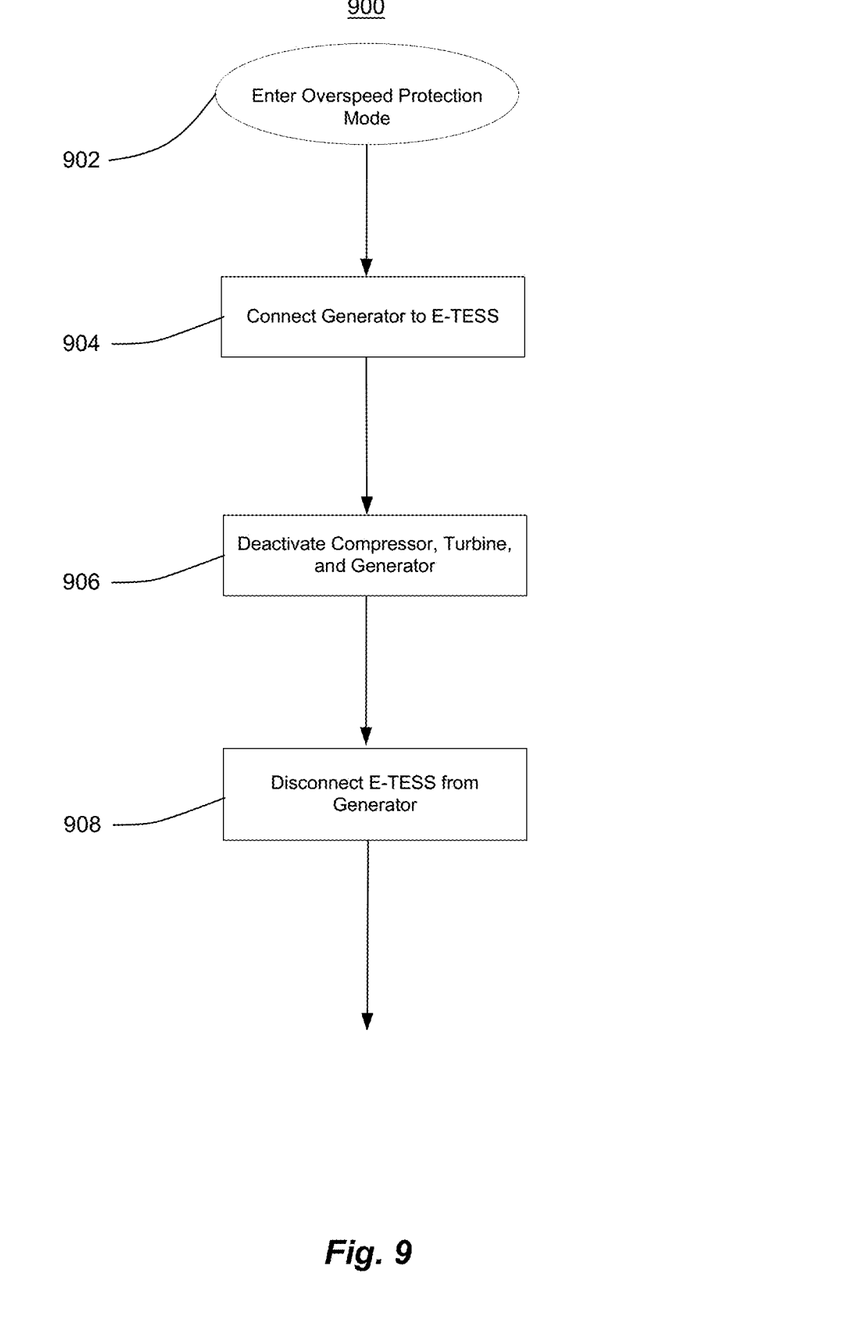
FIG. 9 provides a flow chart depiction operation of the gas turbine generator system of FIG. 6 in overspeed protection mode.

Referring to flow chart 900 in FIG. 9 there is depicted the operation of gas turbine generator system 600 during overspeed protection mode. When the gas turbine generator system 600 is operating in grid power mode, system controller 620 is monitoring breaker 604 to ensure it remains in the closed position and the generator is providing power to electric grid 602. If system controller 620 senses the opening of breaker 604 in response to a fault condition on electric grid 602, it transitions the system to overspeed protection mode in step 902 of flow chart 900. In step 904, system controller 620 instructs switch/breaker controller to close switch 624 which causes the power being output from the generator 616 to be routed over line 625 to the electrical input of the E-TESS 610 thereby preventing generator 616 from going into an overspeed condition as the E-TESS 610 provides a sufficiently large electrical load.

While connected to the E-TESS 610, the system begins a shut-down process, by deactivating compressor 605, turbine 612, and generator 616 in a safe manner, including opening, by valve controller 626, control valves 630 and 632 to bleed gas out of the system to ambient to release pressure build-up in the system. After the system has been safely shut down, in step 908, switch/breaker controller 618 opens switch 624 to disconnect E-TESS 610 from the generator 616.

The embodiments of the disclosure described above are intended to be merely exemplary; numerous variations and modifications will be apparent to those skilled in the art. All such variations and modifications are intended to be within the scope of the present disclosure.

What is claimed is:

1. A gas turbine generator system configured to be electrically interconnected to an electrical grid via a first circuit breaker, the gas turbine generator system comprising:
a compressor configured to compress a received gas and output a pressurized gas flow;
an electrically heated thermal energy storage system; wherein the electrically heated thermal energy storage system is configured to receive at a fluid input the pressurized gas flow from the compressor, heat the pressurized gas flow, and output a heated and pressurized gas flow from a fluid output;
a gas turbine configured to receive the heated and pressurized gas flow from the fluid output of the electrically heated thermal energy storage system to cause the gas turbine to rotate and drive an electrical generator, wherein the electrical generator outputs electric power to the electrical grid via the first circuit breaker, operating in a normally closed position;

a controller configured to detect an opening of the first circuit breaker, thereby disconnecting the electrical generator from the electrical grid; the controller configured to operate in an overspeed protection mode, wherein the controller closes a first switch, in response to the opening of the first circuit breaker; wherein the first switch is connected to the output of the electrical generator and to an electrical input of the electrically heated thermal energy storage system, thereby electrically connecting the electrical generator to the electrical input of the electrically heated thermal energy storage system.

2. The gas turbine generator system of claim 1, wherein the electrically heated thermal energy storage system comprises a plurality of electrically conductive bricks that generate heat due to an application of electrical power at the electrical input.

3. The gas turbine generator system of claim 2, wherein the electrically heated thermal energy storage system comprises a plurality of electrically insulating bricks that electrically insulate the plurality of electrically conductive bricks; and wherein the electrically heated thermal energy storage system includes a plurality of flow paths from the fluid input to the fluid output to guide the pressurized gas flow through the electrically heated thermal energy storage system and to heat the pressurized gas flow.

4. The gas turbine generator system of claim 3, wherein the pressurized gas flow is heated to between 1000 degrees and 1700 degrees Celsius.

5. The gas turbine generator system of claim 1, wherein a second switch is interposed between the electrical generator and the first circuit breaker and wherein the first switch is connected at a first end between the second switch and the first circuit breaker and the first switch is connected at a second end at the electrical input to the electrically heated thermal energy storage system.

6. The gas turbine generator system of claim 5, wherein a first valve is included between an output of the compressor and the fluid input of the electrically heated thermal energy storage system; and wherein a second valve is included between the output of the compressor and an input of a third valve, the third valve having an output connected to ambient.

7. The gas turbine generator system of claim 6, wherein the controller is configured to control the gas turbine generator system in a thermal charge mode; wherein in the thermal charge mode the controller a) causes the first valve to open to disconnect the compressor from the fluid input of the electrically heated thermal energy storage system and causes the compressor to be deactivated, b) causes the second switch to be opened to disconnect the electrical generator from the electrical grid, and c) causes the first switch to be closed to connect the electrical grid to the electrical input of the electrically heated thermal energy storage system to heat the electrically heated thermal energy storage system.

8. The gas turbine generator system of claim 6, wherein the controller is configured to control the gas turbine generator system in a grid power mode; wherein in the grid power mode the controller a) causes the first valve to close to connect the compressor to the fluid input of the electrically heated thermal energy storage system and causes the compressor to be activated, b) causes the second switch to be closed to connect the electrical generator to the electrical grid, and c) causes the first switch to be opened to disconnect the electrical input of the electrically heated thermal energy storage system from the electrical grid.

9. The gas turbine generator system of claim 6, wherein in the overspeed protection mode the controller further: a) causes the first valve to open to disconnect the compressor from the fluid input of the electrically heated thermal energy storage system, b) causes the compressor, the turbine, and the generator to each be deactivated, and c) causes the second switch to be opened to disconnect the generator from the electrical input of the electrically heated thermal energy storage system.

10. A method for connecting a gas turbine generator system to an electrical grid via a first circuit breaker, the method comprising:
compressing a received gas and outputting a pressurized gas flow, using a compressor;
receiving at a fluid input of an electrically heated thermal energy storage system the pressurized gas flow, heating the pressurized gas flow, and outputting a heated and pressurized gas flow from a fluid output of the electrically heated thermal energy storage system;
receiving, by a gas turbine, the heated and pressurized gas flow from the fluid output of the electrically heated thermal energy storage system to cause the gas turbine to rotate and drive an electrical generator, the electrical generator outputting electric power to the electrical grid via the first circuit breaker, operating in a normally closed position;
upon detecting an opening of the first circuit breaker, disconnecting the electrical generator from the electrical grid, and operating the gas turbine generator system in an overspeed protection mode; wherein operating the gas turbine generator system in the overspeed protection mode includes closing a first switch, in response to the opening of the first circuit breaker; wherein the first switch is connected to the output of the electrical generator and to an electrical input of the electrically heated thermal energy storage system, thereby electrically connecting the electrical generator to the electrical input of the electrically heated thermal energy storage system.

11. The method of claim 10, wherein the electrically heated thermal energy storage system comprises a plurality of electrically conductive bricks that generate heat due to an application of electrical power at the electrical input.

12. The method of claim 11, wherein the electrically heated thermal energy storage system comprises a plurality of electrically insulating bricks that electrically insulate the plurality of electrically conductive bricks; and wherein the electrically heated thermal energy storage system includes a plurality of flow paths from the fluid input to the fluid output to guide the pressurized gas flow through the electrically heated thermal energy storage system and to heat the pressurized gas flow.

13. The method of claim 12, wherein the pressurized gas flow is heated to between 1000 degrees and 1700 degrees Celsius.

14. The method of claim 10, further comprising providing a second switch interposed between the electrical generator and the first circuit breaker and connecting the first switch at a first end between the second switch and the first circuit breaker and connecting the first switch at a second end at the electrical input to the electrically heated thermal energy storage system.

15. The method of claim 14, further comprising providing a first valve between an output of the compressor and the fluid input of the electrically heated thermal energy storage system; and providing a second valve and a third valve, the second valve positioned between an output of the compressor and an input of the third valve, the third valve having an output connected to ambient.

16. The method of claim 15, further comprising controlling the gas turbine generator system to operate in a thermal charge mode, including causing the first valve to open to disconnect the compressor from the fluid input of the electrically heated thermal energy storage system, causing the compressor to be deactivated, causing the second switch to be opened to disconnect the electrical generator from the electrical grid, and causing the first switch to be closed to connect the electrical grid to the electrical input of the electrically heated thermal energy storage system to heat the electrically heated thermal energy storage system.

17. The method of claim 15, further comprising controlling the gas turbine generator system to operate in a grid power mode, including causing the first valve to close to connect the compressor to the fluid input of the electrically heated thermal energy storage system, activating the compressor, causing the second switch to be closed to connect the electrical generator to the electrical grid, and causing the first switch to be opened to disconnect the electrical input of the electrically heated thermal energy storage system from the electrical grid.

18. The method of claim 15, wherein operating the gas turbine generator system in the overspeed protection mode, further includes causing the first valve to open to disconnect the compressor from the fluid input of the electrically heated thermal energy storage system, causing the compressor, the turbine, and the generator to each be deactivated, and causing the second switch to be opened to disconnect the generator from the electrical input of the electrically heated thermal energy storage system.

* * * * *